Oct. 10, 1961 M. TAMA ET AL 3,004,091
CORELESS INDUCTION FURNACE MELTING OF METALS
Filed Sept. 15, 1958 3 Sheets-Sheet 1

INVENTORS:
Mario Tama and
BY James L. Hoff,
Ernest A. Marmorek,
Their Attorney.

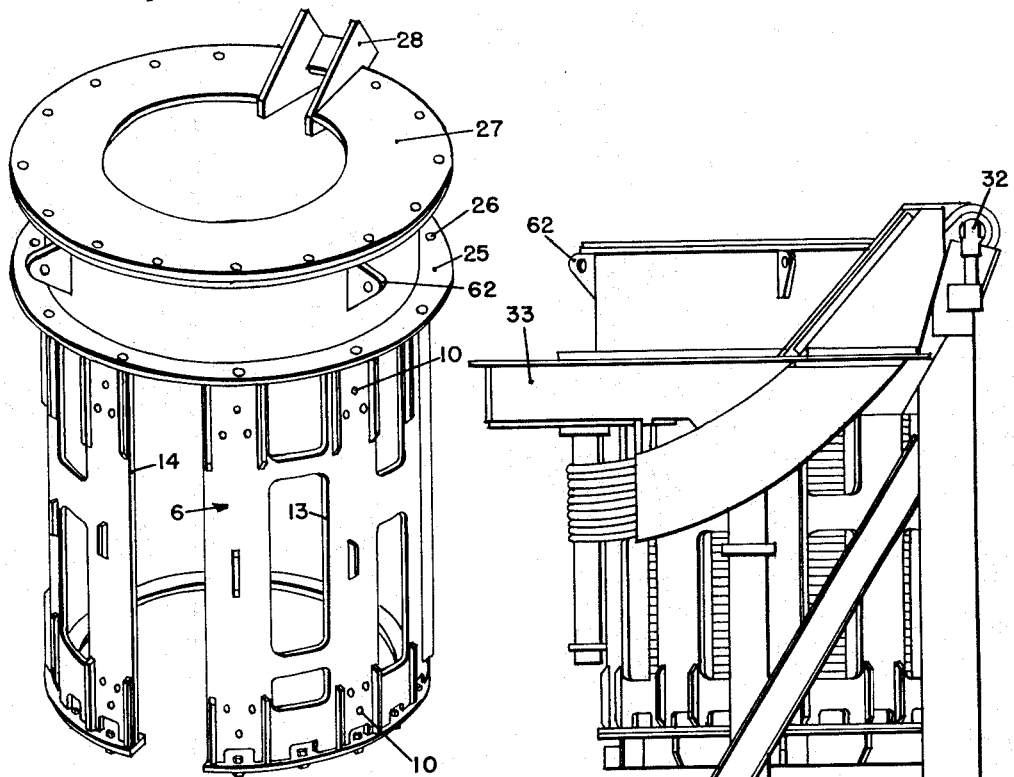
*Fig. 7*
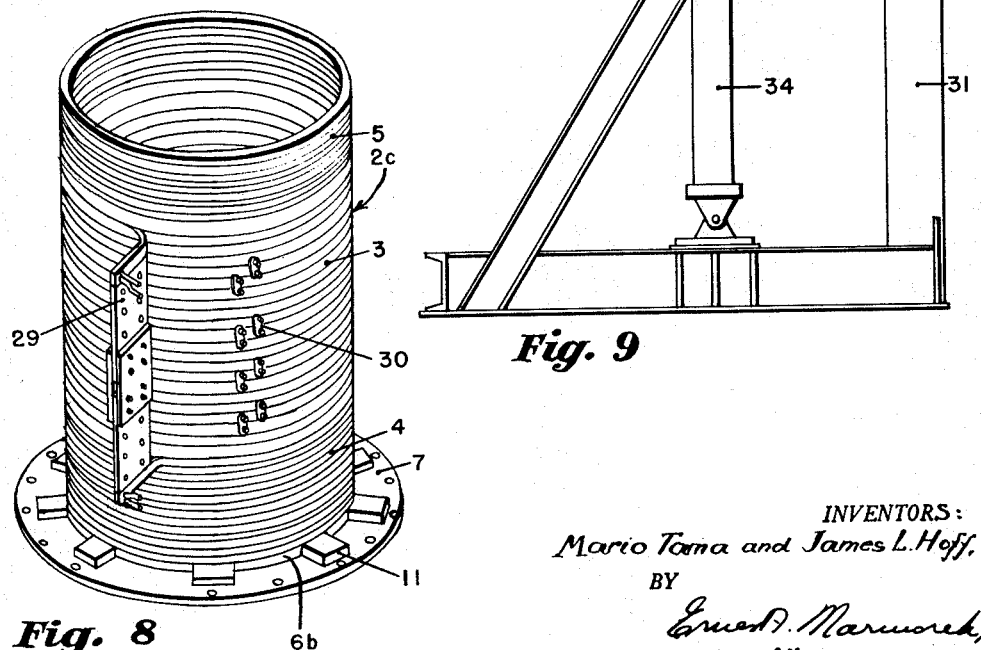
*Fig. 8*
*Fig. 9*
INVENTORS:
Mario Tama and James L. Hoff,
BY
Their Attorney.

Oct. 10, 1961  M. TAMA ET AL  3,004,091
CORELESS INDUCTION FURNACE MELTING OF METALS
Filed Sept. 15, 1958  3 Sheets-Sheet 3

INVENTORS:
Mario Tama and James L. Hoff,
BY
Their Attorney.

United States Patent Office 3,004,091
Patented Oct. 10, 1961

3,004,091
CORELESS INDUCTION FURNACE MELTING OF METALS
Mario Tama, Morrisville, Pa., and James L. Hoff, Pennington, N.J., assignors, by mesne assignments, to Ajax Magnethermic Corporation, a corporation of Ohio
Filed Sept. 15, 1958, Ser. No. 760,972
20 Claims. (Cl. 13—27)

The invention relates to induction melting, and relates more particularly to coreless induction furnace melting of metals. Still more particularly, the invention relates to coreless induction furnaces for melting metals, to methods of building such furnaces, and to laminated yokes used therein.

Furnaces of this type generally include a refractory container for the molten metal, and the container is surrounded by an electrically energizable coil that is circulated internally by a cooling liquid. The coil is interconnected to a source of alternating electric current. When the coil is electrically energized, some of the energy is transferred by the coil to the molten metal within the container by electromagnetic induction. The energy transfer between the coil and the molten metal mass can be kept at a satisfactorily efficient ratio only if the wall of the refractory container is made thin, within very narrow limits, a thickness of from 3 to 5 inches usually being considered adequate.

The required smallness of wall thickness of the container wall presents a serious problem on how to avoid bursting of the container owing to the pressures to which the container is subjected, and this problem is aggravated by the fact that the refractory material of such containers practically has no tensile strength.

To reinforce the weak container adequately has been among the chief endeavors of designers of induction furnaces.

The pressure acting against the refractory walls of the container is composed of several components, namely:

(1) A static hydraulic pressure exerted by the liquid metal against the side walls and the bottom wall of the container. The pressure against the side walls is zero at the metal level and increases proportionately to the depth; this pressure changes in magnitude and position when the furnace is tilted for discharging the molten metal;

(2) A periodic harmonic electromagnetic force which occurs due to the repulsion effect of the electric current that flows in one direction through the coil and in the opposite direction through the molten metal. The electromagnetic force acts in the same direction, but its magnitude varies in sinusoidal form at a frequency which is twice that of the frequency of the power supply, and fluctuates between zero and maximum values, inducing the molten metal to pulsate rhythmically and to pound against the container wall, causing vibrations.

The bottom may be supported, for instance, by a strong metallic plate, but such a plate would normally be subjected to stray currents with attendant prohibitive losses in electric energy. The side wall of the container, which is usually an endless circular wall, can be supported by the coil, but since the coil itself is not a very strong structure, it will need to be supported in turn by a rugged metallic structure. This metallic structure, however, like the previously mentioned metallic bottom reinforcement gives rise to heavy losses of electric energy due to occurring stray currents.

If, on the other hand, the refractory container is not properly supported, it may crack and damage the coil and may even initiate an explosion should the molten metal creep through the cracks and succeed in making contact with the cooling liquid on the inside of the coil.

It is therefore among the principal objects of the invention to provide a reinforcement for the refractory container of an induction furnace and yet to keep energy losses due to any stray currents to a minimum.

Another object of the invention is to decrease the danger of cracking of the refractory container.

It is still another object of the invention to provide a rigid support for the coil without increasing the occurrence of stray currents.

It is still another object of the invention to provide a rigid overall furnace structure which may be tilted into any position, and be easily attached to, or detached from, a tilting mechanism.

Broadly speaking, this is accomplished in accordance with the invention by the provision of a metallic bottom and reinforcement of the coil, and by laminated yoke means internally of these reinforcements which are magnetically continuous, and the provision of adjustably exerting pressure from the exterior against the coil.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel methods, construction, arrangement and combination of various devices, elements and parts, as set forth in the claims hereof, certain embodiments of the same being illustrated in the accompanying drawings and described in the specification.

In the accompanying drawings, certain exemplifications are shown, and wherein,

FIG. 7 is a perspective view of a reinforcement structure surrounding the coil in form of a barrel;

FIG. 8 is a perspective view of a coil and the reinforcing bottom;

FIG. 9 is an elevational view of the furnace suspended on a tilting mechanism;

Figure 2:
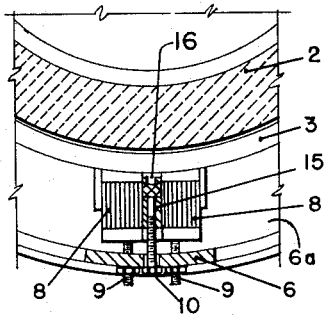
FIG. 2 is a fragmentary sectional view taken on the line 2—2 of FIG. 1.

In carrying the invention into effect in the embodiments which have been selected for illustration in the accompanying drawings and for description in this specification, and referring now particularly to FIGS. 1 to 5, molten metal is held in a refractory container 2 that has an endless upright cylindrical side wall 2a and an integral bottom wall 2b. A helical coil or coil structure 2c encircles the side wall 2a throughout the length of the space inside the container for the molten metal 1. In accordance with a preferred arrangement, the coil structure 2c may be composed of three separate sections 3, 4 and 5 (FIG. 8) which are superposed, with only the central section 3 subject to energization by alternating electric current. This arrangement is described in a separate application about to be filed by one of the applicants hereof, Mario Tama, Serial No. 771,301 filed November 3, 1958.

Figure 1:
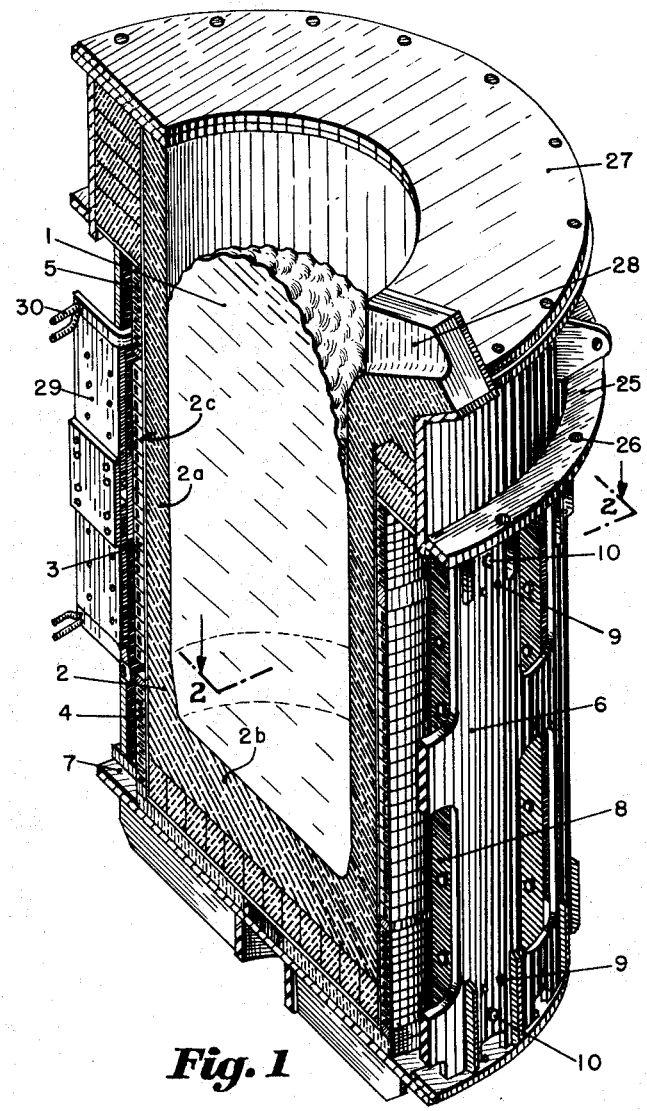
FIG. 1 is a perspective view, partly in section, of a furnace in accordance with an embodiment of the invention.

All the sections of the coil are hollow and cooled by circulation on the interior by a cooling liquid, for instance water. The lowest section 4 of the coil, as best shown in FIGS. 1 and 8, extends downwardly beyond the confines of the container bottom wall 2b.

A barrel structure or barrel 6 surrounds the coil 2. The barrel 6 comprises a metallic cylindrical shell (FIG. 7), and has a detachable metallic circular bottom 7 which serves to support the bottom wall 2b of the container 2. The barrel 6 is made rigid, and is preferably provided with stiffening ribs.

An annular chamber 6a is defined between the barrel 6 and the coil structure 2c, and a disc shaped hollow bottom space 6b is formed between the bottom wall 2b of the container 2 and the bottom 7 of the barrel 6. The axis of the coil 2c coincides with the axis of the container 2 and also coincides with the axis of the chamber 6a.

Laminated silicon steel or iron upright or lateral yokes 8 are disposed in the annular chamber 6a, and each lateral yoke 8 is parallel to the axis of the coil. The yokes 8 are spaced substantially uniformly throughout the annular chamber 6a along the periphery of the coil structure 2c. Each of the lateral yokes 8 is movable radially of the coil axis in opposite directions towards and from the periphery of the coil 2c, and this mobility is utilized to press the yokes 8 releasably against the coil exterior to reinforce the coil and thereby to reinforce the container 2.

Figure 3:
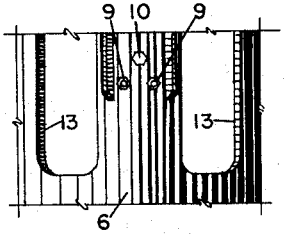
FIG. 3 is a fragmentary side elevational view showing a detail of the furnace exterior.

Each yoke 8 may be moved radially inwardly, for gripping the coil, by means of screws 9 (FIG. 4), and may be moved radially outwardly for retraction and release of pressure on the coil, by means of retraction screws 10 (FIGS. 1, 3 and 7). The screws 9 are threaded in the cylindrical part of the barrel 6 which serves to take up the pressure required to obtain the necessary support for the coil and thereby for the container, and the barrel 6 is suitably dimensioned to withstand such pressures. The screws 10, on the other hand, pass freely through holes in the barrel 6 and are threaded into reinforcement pieces 15 of the yokes 8; the form and function of the pieces 15 is described in detail below.

The compression pressure exerted by the yokes 8 against the coil 2c is a radial pressure only, and there is no compression pressure exerted axially of the coil. The grip by the yokes is an encircling grip, and not one that will shorten the coil.

In the hollow bottom space 6b there are disposed horizontal or bottom yokes 11 and 12 which are also composed of laminated silicon steel or iron.

Figure 5:
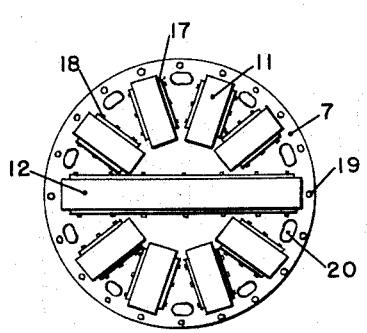
FIG. 5 is a plan view of the bottom portion of the furnace, showing a bottom yoke arrangement.

As best shown in FIG. 5, one of the bottom yokes 12 is diametrical of the bottom 7, while the remaining bottom yokes 11 extend radially for less than one-half of the length of the yoke 12. In FIG. 5, a total of eight yokes 11 are shown and one diametrical yoke 12, and these yokes are assigned in the exemplified embodiment to for instance ten upright yokes 8.

Each of the bottom yokes has its lamellae clamped together by lateral plates 17 and screws 18, and the lateral plates 17 may be welded to the barrel bottom 7. All empty places of the hollow space 6b not covered by any bottom yoke are filled with an insulating filler, for instance with asbestos board, so that the entire bottom structure presents a plane surface supporting the bottom wall 2b of the container 2. The bottom 7 has holes 19 with which it may be bolted to the bottom flange of the barrel 6. Additional holes 20 may be provided to allow for ventilation.

To each lateral yoke 8 there is assigned a bottom yoke 11 or 12, and each lateral yoke 8 is magnetically continuous with a bottom yoke to form a continuous magnetic path to guide the magnetic flux, thereby minimizing the occurrence of electric stray currents in the barrel 6 and in the bottom 7. In this manner, the entire outside structure of the furnace including outside walls and bottom is protected from the stray field, so that any loss due to heating of the outside structure will be negligible.

Figure 4:
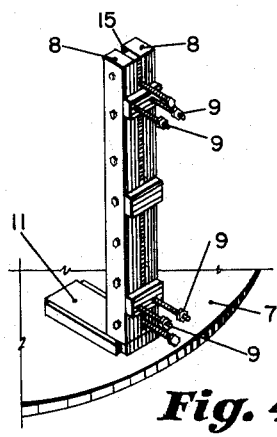
FIG. 4 is a fragmentary perspective view showing a detail of a yoke assembly exemplification.

As best shown in FIG. 4, each lateral yoke 8 may, for example, be in sliding contact with its assigned bottom yoke, thereby providing for magnetic flux continuity and yet for mechanical independence. For this exemplified purpose, each bottom yoke may have a flat top surface in a plane which is perpendicular to the coil axis, and the movement of the lateral yoke sliding thereon takes place in opposite radial directions. The sliding surfaces of the yokes need to be machined, preferably ground.

Each lateral yoke may include two laminated sections each composed of silicon steel lamellae, and a center reinforcement of an elongated parallelpipedal piece 15 of ordinary steel which extends over the entire length of, but has a smaller width than, the laminated yoke sections. The external edge of the piece 15 coincides with the external edge of the laminated yoke. The internal edge, however, stops short of the internal edge of the yoke, and the space left thereby may be filled with a resilient insulating material 16 (FIG. 2). In this manner, each laminated yoke 8 can be reinforced for the exertion of sufficient pressure against the coil without causing any additional energy loss.

The barrel 6 (FIG. 7) has a plurality of inspection openings 13 which are divided into two sections, one above the other, but neither extends to either the top or to the bottom of the barrel. A single opening 14 is provided that extends to the bottom of the barrel 6 to clear the path of the barrel for assembly and disassembly of the furnace over the terminals 29 for the electric current and the connections for the cooling liquid (FIG. 8).

A flange 25 (FIG. 7) that has holes 26 is provided near the upper part of the barrel 6 for fastening the entire furnace structure to the tilting mechanism (FIG. 9). The top of the furnace is closed by a cover 27 (FIG. 7) which is interrupted at one place to make room for the pouring spout 28 (FIG. 1).

Figure 6:
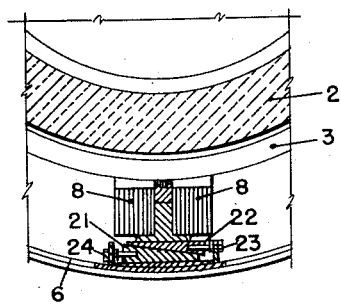
FIG. 6 is a fragmentary sectional view similar to FIG. 2, but showing a modification.

Instead of using the screws 9 and 10 as propelling means for the radial shifting of the lateral yokes 8, as was explained in connection with FIG. 2, there may be used other propelling means for such movement, for instance wedges 21 and 22 shown in FIG. 6. The wedges may be moved against each other by means of spindles 23 and 24 for the radial displacement of the yokes 8.

The assembly of the aforedescribed embodiments is as follows:

The bottom yokes 11 and 12 are first secured to the bottom 7 (FIG. 8) and the empty places of the hollow space 6b filled with an insulating filler like asbestos board. Then the coil 2c is located centrally on the bottom plate 7. Thereafter, the lateral yokes 8 are connected to the interior of the barrel 6 in an outermost position so as to provide for clearance between the yokes 8 and the coil when the barrel 6 (FIG. 7) is lowered over the coil until its lower flange touches the bottom 7. In lowering the barrel, the opening 14 thereof will slide over the electric terminals 29 and their water connections which protrude far beyond the outer circumference of the coil. Since the remaining water connections 30 do not protrude far, no clearance need to be provided for them when the barrel 6 is lowered.

Thereafter, the barrel 6 will be bolted to the bottom 7, and then the screws 9 (FIG. 2) be tightened, or the wedges 21 and 22 (FIG. 6) be operated, to move the lateral yokes 8 radially inwardly for pressing them against the coil to provide for coil reinforcement. During that movement the lateral yokes 8 will slide on their respective bottom yokes 11 and 12, and thereby there will be maintained magnetic flux continuity between the lateral and the bottom yokes in spite of physical movement of the lateral yokes relative to the bottom yokes.

Thereafter, the container 2 will be built. In accordance with one exemplified method, a collapsible mold may be placed in the center of the furnace, and a suitable refractory mixture may then be rammed into the space defined between the mold and the coil. (Cf. article by Pölzguter, 51 Stahl und Eisen 513, 514 (1931).)

After the container 2 has been dried, the entire furnace can be attached to the tilting mechanism, as shown in FIG. 9. Lugs 62 (FIGS. 7 and 9) are provided on the barrel 6 for attachment to a crane to be lifted into the tilting mechanism. The tilting mechanism comprises a frame 31 with two bearings 32 around which a tilting cradle 33 can be pivoted when energized by hydraulic pressure applied to two hydraulic cylinders 34. The furnace may be releasably fastened to the tilting mechanism by means of bolts attached to the flange 25.

Figure 10:
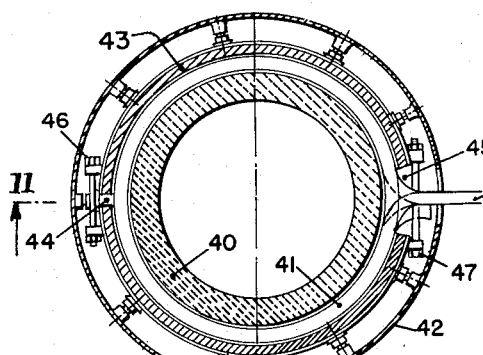
FIG. 10 is a horizontal sectional view of a modified furnace taken on the line 10—10 of FIG. 11.
Figure 11:
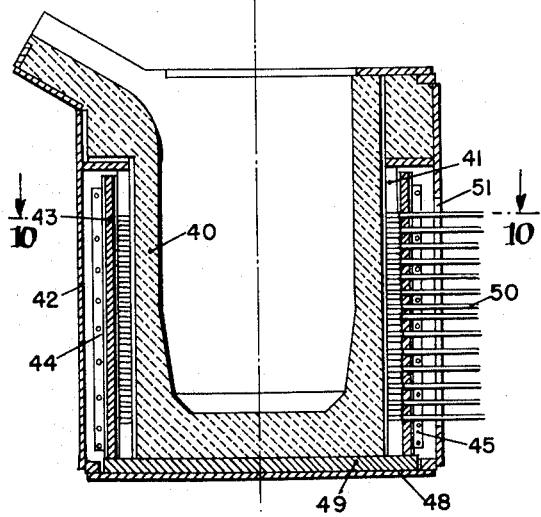
FIG. 11 is a vertical sectional view taken on the line 11—11 of FIG. 10.

In the modification shown in FIGS. 10 and 11, a refractory container 40 is encircled by a liquid cooled helical coil 41. A metallic barrel 42 surrounds the coil. Two lateral laminated silicon steel or iron yokes 43 of arcuate semi-cylindrical shape are provided that have air gaps 44 and 45 therebetween. The yokes 43 are movable towards each other by the tightening of bolts 46 and 47 to reinforce the coil. A metallic bottom 48 is provided with laminated bottom yokes 49 in the manner of construction of the bottom yokes 11 and 12 shown in FIG. 5. The lateral yokes 43 again slide on the bottom yokes 49 when they are moved to tighten or loosen the grip on the coil, thus maintaining throughout the movement of the lateral yokes a continuous magnetic flux path between the side and bottom of the furnace, for the stray field. The electrical terminals (not shown) and the water terminals 50 are carried through an air gap 45 of the yokes 43 and through an opening 51 of the barrel 42.

Figure 12:
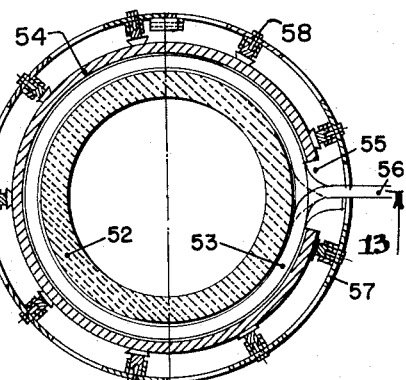
FIG. 12 is a sectional view similar to FIG. 10, but embodying a further modification.
Figure 13:
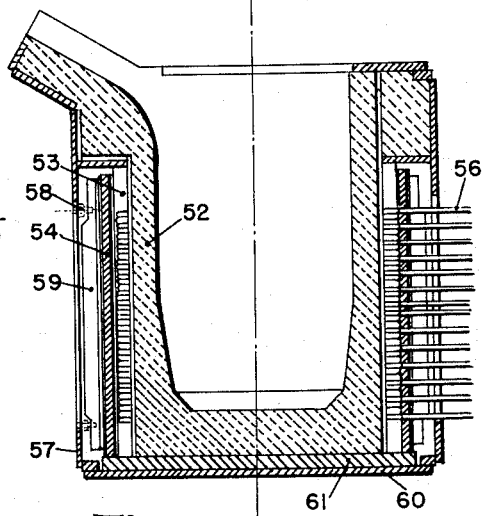
FIG. 13 is a vertical sectional view taken on line 13—13 of FIG. 12.

In the modification shown in FIGS. 12 and 13, a refractory container 52 is surrounded by a helical coil 53 which in turn is surrounded by an arcuate almost completely cylindrical laminated steel or iron lateral yoke 54 that is elastically contractable. There is one gap 55 provided in the yoke 54, which serves to prevent the occurence of a short circuit, and which forms an opening for the electrical terminals and for the liquid connections 56. A barrel 57 is provided with a plurality of screws 58 that exert pressure against steel beams 59 to press the portions of the yoke 54 substantially radially against the coil. The bottom yokes 61 are of the same construction as the bottom yokes 11 and 12 shown in FIG. 5. In this modified construction it is again possible to move the portions of the lateral yoke 54 radially to and from the coil to tighten and respectively loosen the grip thereon for reinforcement, while sliding on the bottom yokes 61 to maintain magnetic flux continuity.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. A coreless induction furnace for melting metals, comprising in combination, a refractory container having a side wall and a bottom wall, an electrically energizable coil surrounding the side wall of said container, a barrel having a wall surrounding said coil and having a bottom, said barrel wall and said side wall of said container defining an annular chamber, said bottom wall of said container and said barrel bottom defining a space, laminated first yoke means movably disposed in said annular chamber, laminated second yoke means secured in said space, said first yoke means being magnetically continuous with and mechanically independent of said second yoke means and operable for releasably gripping the exterior of said coil thereby to reinforce said container, and propelling means operable for moving said first yoke means.

2. A coreless induction furnace, as claimed in claim 1, said first yoke means comprising an arcuate yoke being contractable for substantially radial movement of its portions, said second yoke means comprising a series of yokes slidingly engaged by said arcuate yoke portions.

3. A coreless induction furnace, as claimed in claim 1, said first yoke means comprising at least two arcuate yokes movable towards and from each other, said second yoke means comprising a series of straight yokes slidingly engaged by said arcuate yokes.

4. A coreless induction furnace, as claimed in claim 1, said propelling means comprising a set of screws disposed between said barrel and said first yoke means operable to exert a force on said first yoke means for movement thereof.

5. A coreless induction furnace as claimed in claim 1, said propelling means including wedge means intermediate said barrel and said first yoke means operable to exert a force on said first yoke means for movement thereof.

6. A coreless induction furnace, as claimed in claim 1, said coil being helically wound and having an axis, said first yoke means comprising a set of lateral elongated yokes parallel of the coil axis and spaced apart from each other along the coil periphery and each being movable radially of the coil, said second yoke means comprising a set of elongated bottom yokes disposed radially of the coil, each lateral yoke being in all positions in contact with a bottom yoke.

7. A coreless induction furnace, as claimed in claim 6, together with flange means secured to the exterior of said barrel and operable to suspend said barrel and thereby the entire furnace from a separate tilting mechanism.

8. A coreless induction furnace for melting metals, comprising in combination, a container having a refractory side wall and a floor, an electrically energizable coil encircling the side wall of said container, a metallic barrel surrounding said coil and having a bottom below said floor, means operable for guiding the magnetic flux about said coil thereby restraining the occurrence of stray electric currents in said barrel and bottom, and means operable for tightening said coil about said container.

9. A furnace as claimed in claim 8, said flux-guiding means including a set of first yokes disposed between the coil and the barrel parallel with the coil axis, and a second set of laminated iron yokes between the floor of the container and the bottom of the barrel, said yokes of the first set being movable, said tightening means including said yokes of the first set, and a propelling mechanism for moving the same, each yoke of the first set being in sliding magnetically continuous contact with a yoke of the second set.

10. A coreless induction furnace for melting metals, comprising in combination, a refractory container having a side wall and a bottom wall, an electrically energizable coil encircling the side wall of said container, a metallic barrel having a wall surrounding said coil and having a bottom, the exterior of said coil defining with the exterior of said barrel wall an annular chamber, the bottom wall of said container defining with the bottom of said barrel a space, movable means disposed in said annular chamber operable to exert radially inwardly directed pressure against the exterior of said coil, and laminated iron yokes disposed between said barrel and said container and operable to guide the magnetic flux generated by electric current flowing through the energized coil, some of said yokes constituting first yokes disposed in said annular chamber and other yokes constituting second yokes disposed in said space, each first yoke being in contact with a second yoke for flux continuity therebetween though mechanically independent thereof.

11. A coreless induction furnace for melting metals, comprising in combination, a refractory container having a side wall and a bottom wall, an electrically energizable coil structure encircling the side wall of said container, a metallic barrel having a wall surrounding said coil structure and having a bottom, a set of laminated iron-containing first yokes disposed along the periphery of the coil structure positioned between the coil structure and the wall of said barrel parallel of the axis of said coil, a set of laminated iron-containing second yokes disposed between the bottom of said barrel and the bottom wall of said container, each first yoke being magnetically continuous with a second yoke, and means including said first yokes operable for exerting radially inwardly directed pressure against the external surface of said coil structure.

12. A coreless induction furnace for melting metals, comprising in combination, a refractory container having a side wall and a bottom wall, an electrically energizable coil structure encircling the side wall of said container, a metallic barrel having a wall surrounding said coil structure and having a bottom, a first set of laminated iron-containing yokes disposed between the external surface of said coil structure and the internal wall surface of said barrel, a second set of laminated iron-containing yokes disposed between the bottom of said barrel and the bottom wall of said container, said sets of yokes being arranged magnetically continuous and mechanically independent.

13. A furnace as claimed in claim 12, the yokes of said first set being movable radially of said coil structure and in sliding contact with the yokes of the second set.

14. A furnace as claimed in claim 12, together with, means intermediate said barrel and said yokes of the first set operable to press the yokes of the first set against the external surface of the coil structure for tightening the grip thereof on the container thereby reinforcing said container.

15. A coreless induction furnace for melting metals, comprising in combination, a refractory container, an electrically energizable coil encircling said container, a metallic barrel surrounding said coil, a first set of laminated iron-containing yokes disposed adjacent the external surface of said coil, a second set of laminated iron-containing yokes disposed adjacent the bottom of said container, said sets of yokes forming contact surfaces disposed in a plane perpendicular to the axis of said coil.

16. A coreless induction furnace for melting metals, comprising in combination, a refractory container having a side wall and a bottom wall, an electrically energizable coil encircling the side wall of said container, a metallic barrel surrounding said coil and having a bottom, an annular chamber being defined by said coil and said barrel, and a space being defined by said bottom wall of said container and the bottom of said barrel, a first set of laminated iron-containing yokes disposed in said annular chamber, a second set of laminated iron-containing yokes disposed in said space, a yoke of each of said sets being arranged magnetically continuous with a yoke of the other set though mechanically independent thereof.

17. A laminated furnace yoke, comprising two laminated side sections each including silicon steel lamellae, and a central section of smaller width than said lamellae and composed of solid steel disposed between said side sections, and defining near one side with said side sections a gap, and insulating resilient material disposed in said gap and protruding beyond the outline of said sections and operable to act as a buffer when the yoke is applied against a stationary part of said furnace.

18. A barrel, for use in a coreless induction furnace in connection with an electrically energizable coil having terminals aligned axially, said barrel comprising an outer shell surrounding said coil, said shell having a slot extending from one edge throughout the major portion of the length of said barrel forming a clearance path for said terminals when said barrel is lowered over said coil.

19. A barrel, for use in connection with a coreless induction furnace having a coil encircling a container, said barrel comprising a shell surrounding said coil to reinforce said coil and thereby said container, and a flange rigidly secured to the exterior of said barrel and suspended from a separate tilting mechanism.

20. In a coreless induction furnace for melting metals of the class wherein an electrically energizable coil has terminals aligned axially, the combination with said coil of a barrel having an outer shell surrounding said coil, said shell having a slot extending from one edge throughout the major portion of the length of said barrel forming a clearance path for said terminals when said barrel is slid axially over said coil.

References Cited in the file of this patent

UNITED STATES PATENTS

| | | |
|---|---|---|
| 1,616,180 | Field | Feb. 1, 1927 |
| 1,795,827 | Brace | Mar. 10, 1931 |
| 1,810,820 | Davis et al. | June 16, 1931 |
| 1,855,750 | Long | Apr. 26, 1932 |
| 1,942,164 | Frohlick et al. | Jan. 2, 1934 |
| 2,181,707 | Perreault | Nov. 28, 1939 |
| 2,466,448 | Lentz | Apr. 5, 1949 |
| 2,547,045 | Sabol | Apr. 3, 1951 |
| 2,852,587 | Junker | Sept. 16, 1958 |